Figures 1, 2, 3:
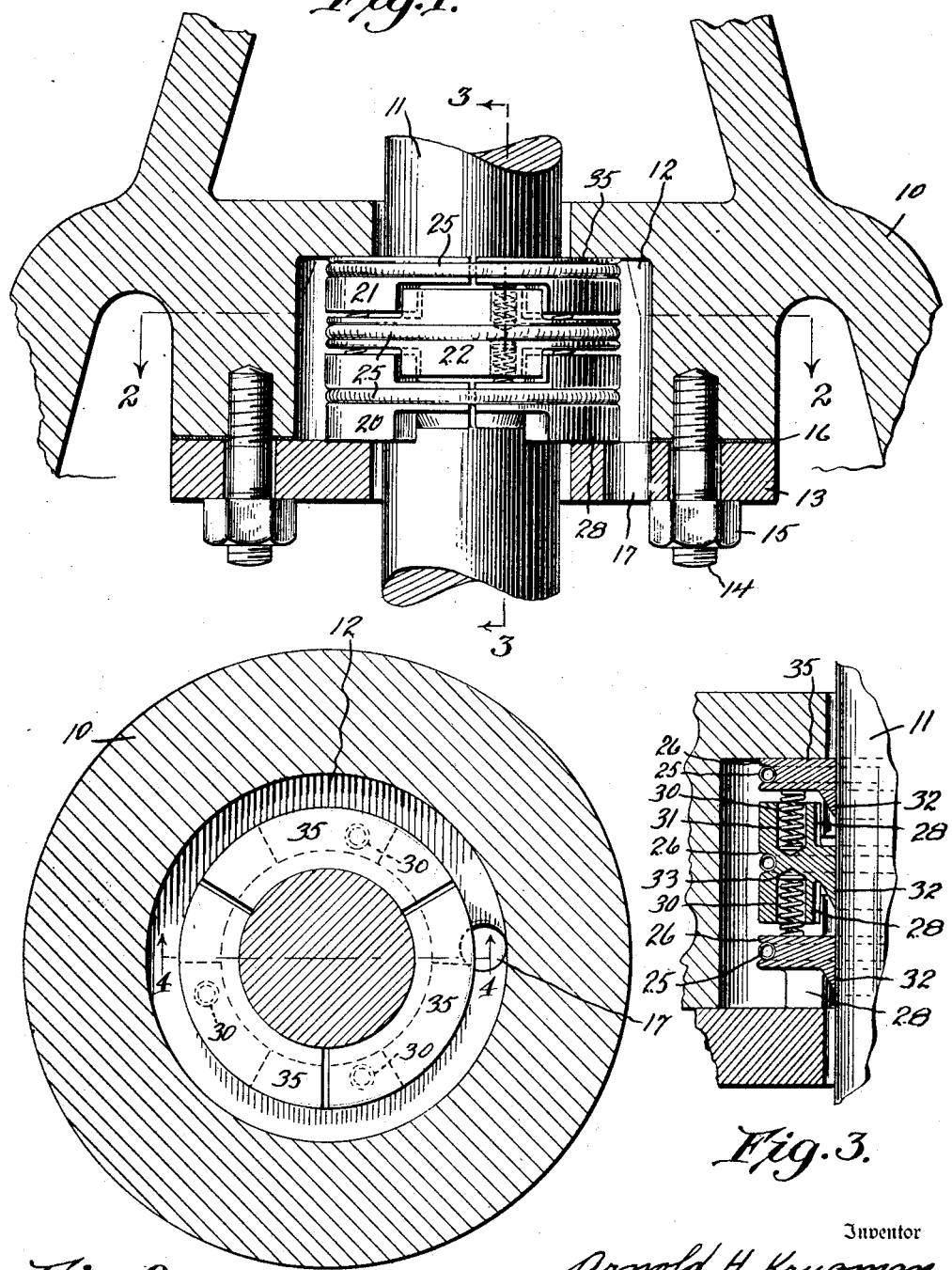

March 29, 1932. A. H. KRUGMAN 1,851,946
WIPER RING FOR RECIPROCATING RODS
Filed Feb. 13, 1929 2 Sheets-Sheet 1

Inventor
Arnold H. Krugman
Hull, Brock & West
Attorneys

March 29, 1932.  A. H. KRUGMAN  1,851,946
WIPER RING FOR RECIPROCATING RODS
Filed Feb. 13, 1929  2 Sheets-Sheet 2
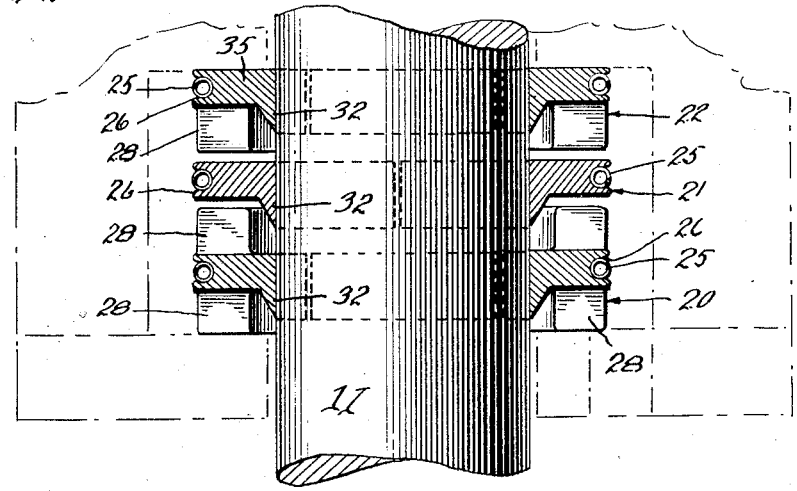
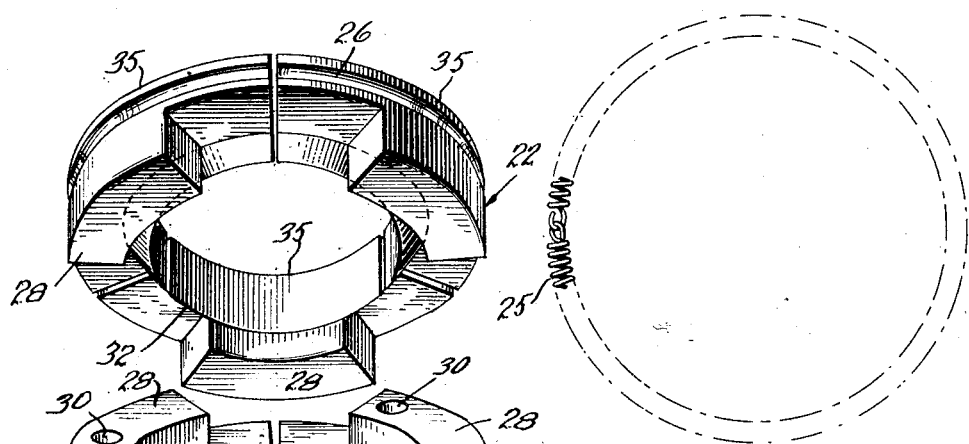
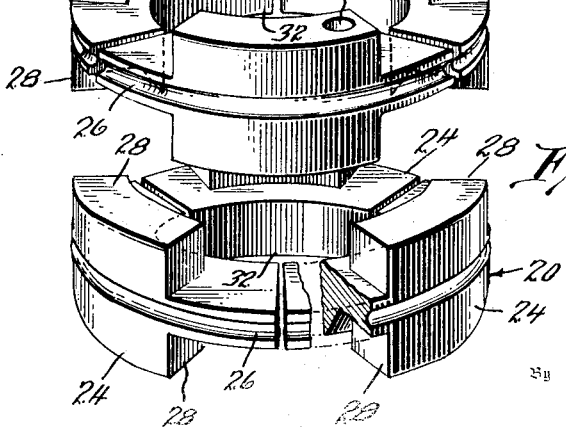
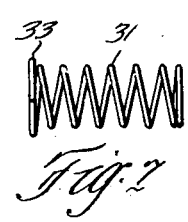
Inventor
Arnold H. Krugman
By Hill, Brock & West
Attorney Patented Mar. 29, 1932

1,851,946

UNITED STATES PATENT OFFICE

ARNOLD H. KRUGMAN, OF ELYRIA, OHIO, ASSIGNOR TO ROMEC PUMP COMPANY, OF ELYRIA, OHIO, A CORPORATION OF OHIO

WIPER RING FOR RECIPROCATING RODS

Application filed February 13, 1929. Serial No. 339,524.

This invention relates to improvements in rod packings and particularly to improvements in wiper rings for reciprocating rods.

The object of my invention is to provide a wiper ring assembly for reciprocating rods which may be used in the ordinary stuffing box without altering the same.

A further object is to provide a wiper ring assembly which will float freely in the stuffing box and always maintain a close fit on the piston rod even though it may have some lateral movement as it reciprocates.

A still further object is to provide the rings with cooperating parts so that the joints of the rings will never come into alignment.

With these and such other objects in view as will appear from the description the invention resides in all the novel features of construction and combination of parts hereinafter described and particularly pointed out in the appended claims.

In the accompanying drawings, Fig. 1 is a side elevation of the wiper assembly in a stuffing box which is shown in section; Fig. 2 is a sectional view on line 2—2 of Fig. 1; Fig. 3 is a fragmentary sectional view through the wiper ring assembly; Fig. 4 is a section through the wiper ring assembly on line 4—4 of Fig. 2; Fig. 5 is a perspective view of the rings separated from one another; Fig. 6 is a fragmentary view of the spring for holding the sections of the ring in assembled relation, and Fig. 7 is an enlarged view of one of the compression springs which is interposed between the rings.

Describing the invention as it is illustrated in the drawings and referring to the various parts by reference numerals, with like numerals referring to like parts in the several views, 10 designates the top portion of a crank case through which the piston rod 11 reciprocates and which is provided with the usual stuffing box 12 over which the gland or cover plate 13 is secured by bolts 14 with nuts 15 threaded thereon. A sheet gasket 16 is interposed between the plate 13 and casing 10 and the plate 13 is provided with openings 17 through which the oil may drain back into the crank case of the machine.

Within the stuffing box 12 fitting closely about the rod 11 is the wiper ring assembly which in the form illustrated in the drawings consists of three rings 20, 21 and 22.

The ring 20 is comprised of three similar segments 24 which are retained in assembled relation by a garter spring 25 which fits in a groove 26 in the outer periphery of each of the segments. Each segment 24 includes lug portions 28 which project axially from the opposite side faces of the body of the segments. These lug portions are about half as long as the segment itself and are located midway between its ends. It will be noted that these lugs do not extend the full width of the segment but are spaced outwardly from its inner periphery. Each segment is also provided on one side with a knife edged lip 32 which extends axially from the inner periphery thereof and which is adapted to fit closely about the piston rod 11 and as the piston rod reciprocates deflect the oil it scrapes from the rod outwardly away from it.

The center ring 21 is substantially identical in construction with the ring 20, being made in three segments with lugs 28 and oil deflecting lip 32. In this center ring 21, however, sockets 30 are provided in the lugs 27 and 28 for the reception of compression springs 31.

Ring 22 is constructed of three segments 35 which are similar to the segments 24 of ring 20 having a lug portion 28 and knife edged oil deflecting lip portion 32 on one side. The opposite side face of the segments are plain so that a relatively tight joint may be effected between this outer ring and the stuffing box.

The springs 31 are each provided with one end coil 33 materially greater in diameter than the rest of the spring. This end coil 33 fits tightly in the sockets 30 of the center ring and retains the spring therein while the spring itself is free to operate in the socket.

When the rings 20, 21 and 22 are assembled the lugs 28 interfit with each other so that there can be no relative rotation of the rings and it is impossible for the joints between the segments of one ring ever working into alignment with the joints of the next ring. When the rings are assembled about the rod 11 there is a small clearance between the ends of the segments of each ring to allow the ring segments to come together as they wear on the rod.

The springs 31 in the sockets 30 of the center ring 21 hold the end rings 20 and 22 yieldingly against the end walls of the stuffing box and allow for variations in length of various stuffing boxes in which they may be used.

The assembling of the rings on the rod is obvious. The springs 31 held in the sockets 30 by the enlarged coil 33 prevent them from dropping out while being assembled.

It will be noted that the sockets 30 are located to one side of the center of the lugs 28 to avoid having the spring come directly over the joints of the next adjacent ring segments against which the springs press.

The operation of the wiper assembly is clear. As the rod 11 reciprocates carrying oil upward at each upward stroke the lips 32 scrape off this oil deflecting it outward between the rings to the outer parts of the stuffing box 11 from where it drains through the openings 17 back into the crank case.

It is obvious that when the piston rod is reciprocating through a wall on each side of which are different liquids a second set of rings arranged with the lips 32 in the opposite direction may be used. They would prevent the liquid from being carried into the box 12.

It is also apparent that the rings may be provided with lips 32 on both sides and the liquids stripped from the rod be drained to any desired place from the box 12.

It is also obvious that this wiper ring assembly may be used on a horizontally as well as a vertically disposed piston rod, the views on the drawings being merely illustrative and not limiting.

While I have illustrated each ring as being in three sections, it is to be understood that the rings may be made in only two or more than three sections constructed in the same general manner with substantially centrally disposed lugs and the adjacent rings interlocking as described above. The lips 32 of the rings would function in the same manner.

Having thus described my invention, what I claim is:—

1. A packing for a piston rod or the like comprising a plurality of ring members each composed of a plurality of separate segments, means for holding said segments in contact with said rod, adjacent rings being notched and interfitting with each other, and resilient means carried by one of said rings tending to separate them in a direction longitudinal to said rod, each segment of each ring having a knife edged oil deflecting lip fitting closely against said rod, all said lips extending in the same direction.

2. A packing for a piston rod or the like comprising a plurality of ring members each composed of a plurality of separate segments, means for holding said segments in contact with said rod, adjacent rings being notched and interfitting with each other, and resilient means carried by one of said rings tending to separate them in a direction longitudinal to said rod, each segment of each ring having a knife edged oil deflecting lip fitting closely against said rod, all said lips extending in the same direction, there being in all positions of said rings a space adjacent each knife edge into which oil may flow.

In testimony whereof, I hereunto affix my signature.

ARNOLD H. KRUGMAN.